Figure 7:
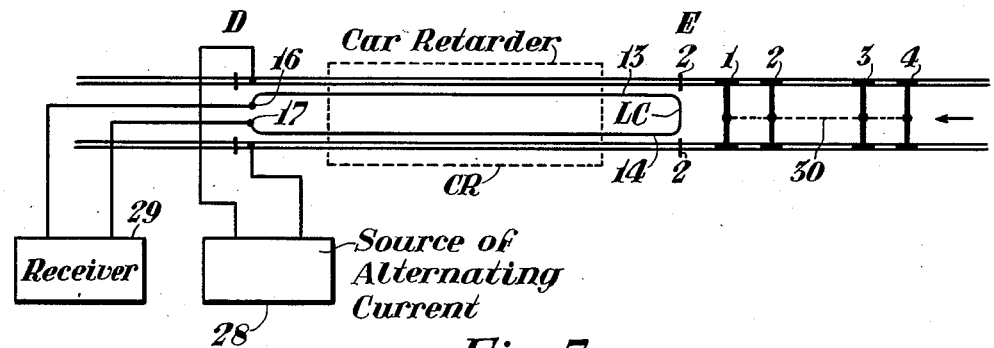

Nov. 13, 1956  E. J. AGNEW  2,770,775
WAYSIDE VEHICLE SPEED DETERMINING MEANS
Filed Dec. 21, 1951  2 Sheets-Sheet 1
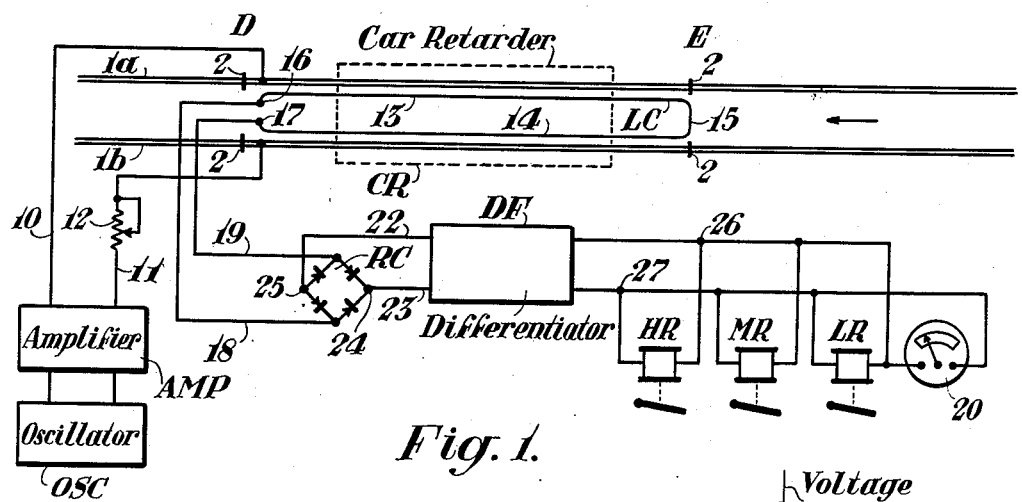
Fig. 1.
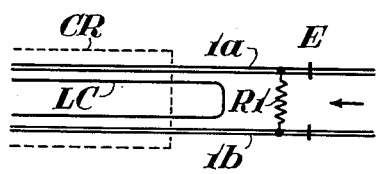
Fig. 1a.
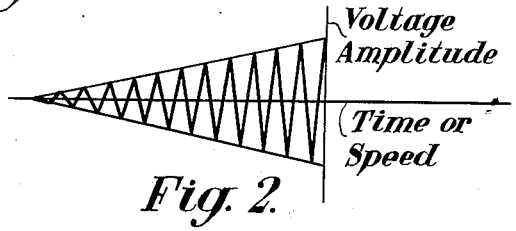
Fig. 2.
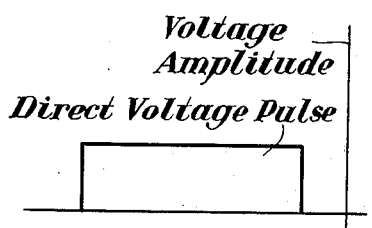
Fig. 6.
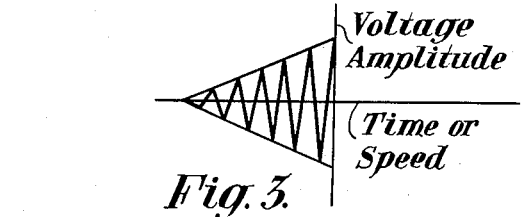
Fig. 3.
Fig. 5.
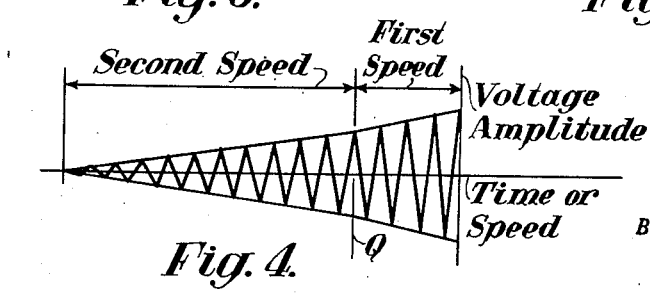
Fig. 4.
INVENTOR.
Edward J. Agnew
BY
W. L. Stout
HIS ATTORNEY Nov. 13, 1956      E. J. AGNEW      2,770,775
WAYSIDE VEHICLE SPEED DETERMINING MEANS
Filed Dec. 21, 1951      2 Sheets-Sheet 2

INVENTOR.
Edward J. Agnew
BY
W. H. Stout
HIS ATTORNEY

# United States Patent Office 2,770,775
Patented Nov. 13, 1956

2,770,775
WAYSIDE VEHICLE SPEED DETERMINING MEANS

Edward J. Agnew, Swissvale, Pa., assignor to Westinghouse Air Brake Company, Wilmerding, Pa., a corporation of Pennsylvania Application December 21, 1951, Serial No. 262,831

15 Claims. (Cl. 324—70)

My invention relates to wayside vehicle speed determining means and more particularly to wayside means for determining the speed at which a railway car or train moves through a given section of track.

There are places along a railway track at which it is desirable to determine the speed of a passing car or train, the measured speed being used for controlling the car or train or some other device associated therewith. For example, in classification yards using humps, car retarders are provided for controlling the speed at which the cuts of cars or car units approach the yard tracks into which they are being classified. These retarders include braking bars which are movable toward and away from the rails for frictional engagement with the sides of the wheels of the cars moving through the retarder, the position of the bars determining the degree of braking force exerted. Generally, the movement of the braking bars is electrically controlled by an operator located in a tower where he can observe the cars units and govern the braking force to be exerted by the retarder according to the speed at which the car unit in his judgment is moving as it approaches and moves through the retarder. Obviously there is a correct speed at which a car unit should leave a retarder in order for the cars to drift into a selected yard track and couple to the cars already standing in the track without too great an impact. To this end the degree of braking force exerted by the retarder is varied as the car unit is progressing through the retarder, the braking force being increased when the car speed is too high and the braking force reduced when the car speed is equal to or less than the speed at which it is required that the car unit leaves the retarder.

It has been proposed to govern the braking force of retarders automatically according to the speed of the car unit and thus remove the errors that arise by the operator wrongly judging the car speed. In these automatic systems it is a problem to provide means for determining the speed of the car unit as it is about to enter the retarder and as it progresses through the retarder, this problem being difficult because the car speeds are low and a relatively narrow range of speeds is involved. The problem is further complicated due to the construction of the track at a retarder and due to the close spacing between the individual car units that usually prevails, this spacing often being such that a following car unit is ready to enter the retarder as a leading car unit is leaving the retarder.

Highway grade crossings are other points along railways at which it is desirable to determine the speed of a train or car, the measured speed being used to control the warning operation of a highway crossing signal located at the intersection of the highway and railway. It is generally desirable to so control the warning operation of the highway crossing signal that substantially the same warning period prior to the arrival of the train at the crossing is obtained regardless of the speed of the train.

In view of the foregoing circumstances and others, an object of my invention is the provision of novel and improved methods for determining the speed of a railway vehicle.

A further object of my invention is the provision of a novel and improved wayside railway train or vehicle speed determining means.

Another object of my invention is the provision of wayside railway train speed determining means suitable for use where relatively low speeds and a relatively narrow range of speeds are involved.

A feature of my invention is the provision of improved means for determining the speed of a car unit as it enters and passes through a car retarder of a classification yard.

A more specific feature of my invention is the provision of improved car speed determining means which can be applied to a complicated track structure, such as is frequently found at car retarders.

Other features, objects and advantages of my invention will appear as the specification progresses.

The foregoing objects, features and advantages of my invention are attained by the provision of a track circuit for a track section of the railway track and a loop circuit mounted for inductive relation therewith. In one form of the invention the track section is an insulated section formed at the location at which it is desirable to determine the train or car speed and the rails of the section are included in a track circuit having a source of periodic current, such as an alternating current of a selected frequency, connected across the rails at a selected end of the section, the selected end being preferably the exit end with respect to the normal direction of traffic through the track section. Thus the periodic current flows in the rails in series when a car enters the section, current flowing at any given instant from the exit end in one rail up to the shunt formed by the leading pair of wheels of the car or train and back the other rail, substantially no current flowing behind the train shunt. It follows that the portion of the rails in which current flows progressively decreases as the leading pair of wheels of the car or train moves from the entrance end to the exit end of the section. Preferably, the track circuit includes an impedance or resistance which is relatively high as compared to the impedance of the section rails at the frequency of the periodic current used. Thus, the magnitude of the track circuit current varies only little and remains substantially constant as the rail impedance is shunted out by the car shunt progressing from the entrance end to the exit end of the section.

The loop circuit associated with the track section preferably includes two conductors one mounted alongside one section rail for the full length or at least a selected portion of the section and the other mounted alongside the other section rail for the full length or the selected portion of the section, the two conductors being joined at one end and left open at the other end. As thus mounted each conductor of the loop circuit has a distributed inductive relation with the rail along which it is mounted and there appears across the open end of the loop circuit a voltage due to the inductive relation between the loop circuit conductors and the rails of the track section when a car moves through the track section and causes periodic current to flow in the rails due to the shunt formed by the leading pair of wheels of the car. The value of this induced voltage is determined by the magnitude and frequency of the periodic current supplied to the rails and by the length of the rails in which the current flows before it is shunted by a car or train. With a given frequency and the magnitude of current constant, the induced voltage varies in direct proportion to the length of the rails in which the current flows. Consequently, the induced voltage has a predetermined maximum value when the leading pair of wheels of the car shunts the rails at the entrance end of the section and the voltage decreases from this maximum value to substantially zero when the car shunts the rails adjacent the exit end. Obviously, the rate at which the induced voltage decreases from its maximum value to zero is determined by the time consumed by the car in passing through the section and it follows, therefore, that the rate of decrease of this induced voltage is a measure of the speed of the car or train.

While the loop circuit provided for the section is referred to above as including two conductors, it is clear that the loop circuit can consist of several turns of a suitable conductor, one side of the circuit being mounted along one section rail and the other side of the loop circuit being mounted along the other section rail.

Also, in place of the loop circuit conductors being mounted along the section rails for substantially the full length of the section it is clear that the loop circuit can be arranged for its conductors to be mounted along only a selected portion of the section. In this case the voltage induced in the loop circuit is a predetermined value until the leading pair of wheels shunt the rails at the entering end of this selected portion of the section and decreases to zero when the leading pair of wheels reach the exit end of this selected portion. Furthermore, it is to be pointed out that in place of the two sides of the loop circuit being mounted one along one section rail and the other along the other section rail, the loop circuit can be mounted for only one side of the circuit to be mounted along one section rail and the inductive relation is between this one side of the loop circuit and the one section rail.

This induced voltage is applied to receiving apparatus connected across the open end of the loop circuit, this receiving apparatus including means responsive to the periodic voltage and effectively influenced by the rate of change of the value of the voltage. That is, the receiving means includes means which determines the speed of the car by determining the rate of change of the magnitude of the induced voltage.

In another form of the invention the alternating current is supplied to the loop circuit and a voltage induced in the track rails. Under these circumstances the magnitude of the voltage induced in the track rails is of a predetermined value when the rails are shunted adjacent the end of the loop circuit remote from the end at which the alternating current is supplied and is substantially zero when the rails are shunted adjacent the end of the loop circuit at which the current is supplied, the rate at which the voltage varies in its magnitude being determined by the speed of the car shunting the rails.

Again, when the alternating current is supplied to the rails and the voltage induced in the loop circuit is measured, a resistor may be connected across the rails at the entering end of the section and cause a selected value of alternating current to normally flow in the rail and thereby induce a given voltage in the loop circuit. This given value of induced voltage would be used as a check that the system is in an operating condition. Then when a car enters the section the car shunt would cause the induced voltage to increase to a predetermined value and from which value the induced voltage would decrease to zero as the car progresses to the exit end of the section.

Furthermore, the track circuit and the loop circuit can be arranged for the car to enter the track circuit at the end adjacent the end of the loop circuit at which the current is supplied with the result the induced voltage will be zero and increase to a predetermined value as the car moves through the section adjacent the loop circuit, the rate of increase of the voltage being determined by the speed of the car.

I shall describe certain forms of apparatus embodying my invention and shall then point out the novel features thereof in claims.

Figure 8:
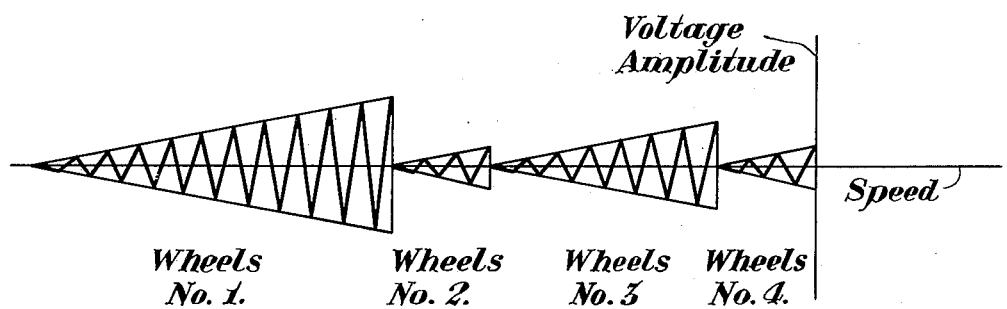
Figure 9:
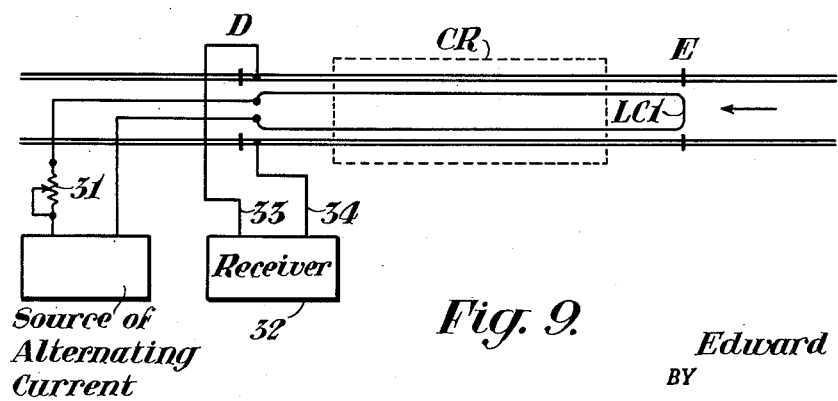

In the accompanying drawings, Fig. 1 is a diagrammatic view showing one form of apparatus embodying my invention when used at a car retarder and the alternating current is supplied to the track circuit. Fig. 1a is a diagrammatic view showing a modification of the track circuit of Fig. 1 that may be used. Figs. 2, 3, 4, 5 and 6 are graphs illustrating operating characteristics of the apparatus of Fig. 1. Fig. 7 is a diagrammatic view illustrating the apparatus applied to a car retarder location and showing the general relation of the different pairs of wheels of a car passing through the retarder with respect to the track circuit. Fig. 8 is a series of graphs illustrating the operating characteristics of the apparatus for the car of Fig. 7 passing through the track section. Fig. 9 is a diagrammatic view showing apparatus embodying my invention when used at a car retarder and the alternating current is supplied to the loop circuit.

In each of the several views like reference characters are used to designate similar parts.

Referring to Fig. 1, the reference characters $1a$ and $1b$ designate the track rails of a railway track associated with a car retarder CR, the retarder CR being indicated conventionally by a dotted rectangle since the retarder may be of standard construction and its structure forms no part of my invention. The rails $1a$ and $1b$ are formed by the usual insulated rail joints indicated conventionally by the reference character 2 into a track section D–E which is electrically insulated from the remaining portion of the track and from the car retarder CR. The direction in which cars pass through the retarder is indicated in Fig. 1 by an arrow shown at the right-hand end of the drawing and hence the end E of the section D–E is the entrance end and the end D is the exit end of the section with respect to this direction of traffic.

The section D–E is of any suitable length and preferably it is made only slightly longer than the car retarder CR so that the entrance end E is a short distance in the rear of the entering end of the retarder and the exit end D of the section is a short distance in advance of the leaving end of the retarder. The rails of the section D–E are, of course, made electrically continuous by bonding. The rails $1a$ and $1b$ of the section D–E are included in a track circuit which also includes a source of current connected across the rails adjacent the exit end D of the section. This source of current may be of any suitable source capable of supplying a periodic current, such as an alternating current, of a selected frequency. As here shown, the current source comprises an oscillator OSC and an amplifier AMP. The oscillator OSC is preferably an electron tube oscillator adaptable of supplying alternating current of a selected frequency, such as, for example, a frequency of the order of 2000 cycles per second but other frequencies can be used. The oscillator OSC is connected to the input of the amplifier AMP which is of a standard arrangement adaptable of amplifying the alternating current to a desired energy level. The output of the amplifier AMP is connected across the rails of the section D–E adjacent the exit end D by wires 10 and 11, a resistor or impedance unit 12 being interposed in the wire 11. For reasons to appear shortly, the unit 12 is made preferably to have a relatively high impedance for the alternating current as compared to the impedance of the rails $1a$ and $1b$ of the section D–E. It follows that when the section D–E is unoccupied substantially no current is supplied from the source of alternating current to the rails, but that when the leading pair of wheels of a car enter the section at the entrance end E, curent flows in the rails and the car shunt in series, current flowing at a given instant in rail $1a$ from left to right, through the car shunt and rail $1b$ from right to to left. The amplitude of the periodic current flowing in the rails remains substantially constant as long as the car occupies any portion of the section because, as stated hereinbefore, the impedance unit 12 is made relatively large as compared to the impedance of the rails and consequently the total impedance of the track circuit remains substantially constand regardless of whether or not the rails are shunted out of the track circuit. In other words, when a car moves through the section from the entrance end E to the exit end D and shunts out the impedance of the rails from the track circuit, there is little or no change in the value of the current flowing because of the relatively high impedance of the unit 12 as compared to the impedance of the rails.

It is to be noted that due to the section D–E being relatively short, there is little leakage current and the leakage current is so small that it can be neglected.

A loop circuit LC is provided for the section D–E and as shown in Fig. 1, this loop circuit LC comprises a conductor 13 mounted alongside of rail 1a for substantially the full length of the section and a conductor 14 mounted alongside the rail 1b for the full length of the section. The conductors 13 and 14 are electrically insulated so that they are insulated from the rails and from the construction of the retarder. Conductors 13 and 14 are of any suitable size and are of a size that would provide satisfactory physical strength. These conductors 13 and 14 may be mounted either inside of the rails or outside of the rails, and preferably they are mounted on the rail base on the inside of the rail and retained in place by clamps not shown. The conductors 13 and 14 are closed at one end which is shown in Fig. 1 is a connection 15 adjacent the entrance end of the section. The other ends of the conductors are open and provided with terminals 16 and 17. It is to be seen, therefore, that this loop circuit LC is a single turn loop circuit closed at one end and having output terminals 16 and 17.

It is to be understood that the invention is not limited to a loop circuit having only two conductors and the loop circuit LC may be made to include more than one turn, the essential element being that at least one side of the circuit is laid along one rail of the section for inductive relation therewith.

When a car enters the section D–E at the entrance end E, and the leading pair of wheels and axle of the car shunt the rails so that alternating current flows in the rails, an alternating voltage having a frequency corresponding to that of the current supplied by the oscillator OSC appears across the terminals 16 and 17 of the loop circuit LC due to the distributed inductance between the conductors 13 and 14 of the loop circuit and the rails of the track section. This voltage appearing across terminals 16 and 17 has a value predetermined by the proportioning of the parts. As the car or train moves toward the exit end of the section, the length of the rails carrying the alternating current progressively decreases because substantially no current flows in the rails behind the shunt. Since the magnitude of the rail current is substantially constant due to the impedance of the rails being small as compared to the impedance of unit 12 of the track circuit, the voltage appearing across the terminals 16 and 17 progressively decreases from the predetermined value of the voltage when the train shunt is at the entrance end E to substantially zero when the train shunt is at the exit end D of the section. This characteristic of the induced voltage made to appear across the terminals 16 and 17 of the loop circuit is illustrated by the graph of Fig. 2. The right-hand end of this graph illustrates the maximum predetermined amplitude of the voltage induced in the loop circuit when the leading pair of wheels shunts the rails at the entrance end of the section and the full length of the rails carries the alternating current, and the left-hand end of the graph shows a substantially zero value for the induced voltage when the leading pair of wheels reaches the exit end of the section.

The envelope of the amplitude of the induced voltage appearing at terminals 16 and 17 is determined by the time consumed by the car in moving through the track section, and assuming the car is moving at a substantially uniform speed, this envelope will be substantially a straight line from the maximum value to zero. This characteristic of the envelope of the amplitude of the induced voltage will be apparent from an inspection of the graph of Fig. 2. Since the time consumed by the car in moving through the section is determined by the average speed of the car the envelope of the amplitude of the induced voltage is a direct indication of the average car speed.

In Fig. 3 there is illustrated the envelope of the induced voltage for a car that travels the section D–E at an average speed that is approximately twice the average speed of the car represented by the graph of Fig. 2.

The graph of Fig. 4 illustrates the induced voltage for a car that enters the section D–E at one speed and the speed of the car is reduced to a lower speed at a point in the section represented by the point Q in the graph.

It follows that the slope of the envelope of the magnitude of the induced voltage at any given point is determined by the instantaneous speed of the car at that point.

The terminals 16 and 17 of the loop circuit are connected to a receiver responsive to this induced alternating voltage. As here shown this receiver includes a rectifier RC, a differentiator DF and speed indicating devices comprises three relays HR, MR and LR, and an indicator 20.

The rectifier RC is preferably a full wave bridge rectifier, the input terminals of which are connected to the terminals 16 and 17 of the loop circuit by wires 18 and 19. The output terminals 24 and 25 of the rectifier are connected to the input of the differentiator DF by wires 22 and 23.

With the induced alternating voltage appearing at terminals 16 and 17 of the loop circuit applied to the rectifier RC, a corresponding direct voltage appears at the output terminals 24 and 25 of the rectifier. This direct voltage will have a maximum value when the car is at the entrance end of the section and the alternating voltage induced in the loop circuit has its maximum value, and the direct voltage progressively decreases to zero as the car advances to the exit end of the section and the induced alternating voltage of the loop circuit is reduced to zero. This characteristic of the direct voltage appearing at the output terminals of the rectifier is illustrated by the graph of Fig. 5, the graph illustrating a substantially uniform speed. It is clear that the slope of the graph at any given point represents the car speed at that point.

It follows that the rate of change of the envelope of the amplitude of the alternating voltage and the rate of change of the direct voltage as illustrated in Fig. 5, directly depends upon the car speed and by proper interpretation of the slope of the direct voltage appearing at the output terminals 24 and 25 of the rectifier, the speed of the car can be determined.

As stated above, the output terminals 24 and 25 of the rectifier are connected to the input of the differentiator DF which includes means that interprets the slope of the direct voltage and causes a direct voltage pulse having an amplitude which varies with the slope of the direct voltage to appear at the output of the differentiator. That is to say, the amplitude of the direct voltage pulses produced by the differentiator DF is a measure of the speed of the car as it travels the track section and thereby furnishes a factor by which the speed of the car at all points along the section can be determined.

The differentiator DF is shown in block form since it may be any one of several arrangements and its specific arrangement forms no part of my invention. It is sufficient for this application to point out that the differentiator DF includes circuit networks, the values of the constants in the circuits of which are such that the voltage at the output terminals of the differentiator is approximately proportional to the rate of change of the input voltage. That is, the differentiator DF includes circuit networks such that a direct voltage pulse is made to appear at the output terminals 26 and 27 in response to the direct voltage created at the terminals 24 and 25 of the rectifier, and applied to the input of the differentiator, the amplitude of the voltage pulse appearing at the output terminals 26 and 27 being approximately proportional to the rate of change of the direct voltage appearing at the terminals 24 and 25 of the rectifier RC and applied to the input terminals of the differentiator DF.

Such a direct voltage pulse is illustrated by the graph of Fig. 6. It is to be seen, therefore, that the amplitude of this direct voltage pulse appearing at the output terminals 26 and 27 of the differentiator is an indication of the speed of the car passing through the section D–E because the rate of change or slope of the envelope of the direct voltage appearing at the terminals 24 and 25 of the rectifier is determined by the speed of the car.

Differentiating circuit networks of the form here involved are described in Chapter 5 of Batcher & Moulic Electronic Control Handbook, 1946, published by Caldwell-Clements, Inc., New York, N. Y.

Car retarders may be controlled to apply three different ranges of braking force according to three different car speeds considered as high speed, medium speed and low speed. The three relays HR, MR and LR are connected in multiple to the output of the differentiator DF and adjusted for high, medium and low pickup voltages, respectively, so that these relays are selectively picked up in response to the magnitude of the output voltage pulse of the differentiator and are in turn selectively controlled according to the speed of the car advancing through the section D–E. Hence these relays by their positions provide an indication of the speed of the car passing through the track section. It is to be understood that other arrangements of control relays can be used.

The indicator 20 is preferably a meter which is connected in multiple with the relays HR, MR and LR to the output of the differentiator and this meter is provided with a needle which is made to vary according to the magnitude of the direct voltage pulse appearing at the output of the differentiator. The scale of the meter 20 would be calibrated to read speeds in miles per hour or feet per second as desired.

Fig. 1a shows a modification of the track circuit of Fig. 1 that may be used. In Fig. 1a a resistor R1 is connected across the rails 1a and 1b adjacent the entrance end E. This resistor R1 is of a selected value and causes a corresponding selected value of alternating current to normally flow in the rails, that is, when no car occupies the section. This alternating current will cause a corresponding voltage to normally appear at the terminals of the loop circuit and a corresponding direct voltage to appear at the output terminals of the rectifier of the receiving apparatus and which direct voltage can be used to energize an indicator and thereby check that the system is in an operating condition. When a car enters the section of Fig. 1a, the car shunt causes the induced voltage to immediately rise to a predetermined value and then decrease from this value to zero as the car progresses through the section in the manner previously explained.

In Fig. 7, an insulated track section D–E is formed in the track at a retarder CR the same as in Fig. 1, and this track section D–E is provided with a track circuit that includes the track rails and a source of alternating current illustrated in Fig. 7 by the reference character 28. Also, the loop circuit LC for the section D–E of Fig. 7 includes a pair of conductors 13 and 14 which are mounted for inductive relation to the rails of the track section in the same manner as explained in connection with Fig. 1. Furthermore, a receiver indicated at 29 in Fig. 7 includes apparatus similar to the receiving apparatus of Fig. 1 and the receiver 29 is connected to the terminals 16 and 17 of the loop circuit LC. With the receiver 29 including means for determining the rate of change of the voltage induced in the loop circuit in the manner explained in connection with the receiving apparatus of Fig. 1, it is clear that the output of the receiver 29 serves to determine the speed of the car.

In Fig. 7, a car is indicated conventionally at 30, this car being provided with two four-wheel trucks of the usual construction of freight cars of railways, the four pairs of wheels being indicated by the numerals 1, 2, 3 and 4. Assuming this car 30 moves through the retarder, the shunting of the rails by the leading pair of wheels 1 of the car will be reflected by an induced alternating voltage appearing at terminals 16 and 17 of the loop circuit, the voltage having a maximum amplitude when the pair of wheels 1 shunt the rails at the entrance end E and decreases to zero when the shunt of the pair of wheels 1 reaches the exit end D of the section. This voltage is illustrated by the left-hand graph of Fig. 8. The envelope of the amplitude of this voltage is an indication of the speed of the car as explained in connection with Fig. 1. When the leading pair of wheels 1 of the car leave the retarder and pass out of the section D–E, there is a short interval during which the rails are effectively shunted by the No. 2 pair of wheels of the car, this shunt being in effect for the interval that it takes the car to advance the distance between the first and second pairs of wheels. The induced voltage appearing at the terminals 16 and 17 of the loop circuit due to the shunting of the rails by the second pair of wheels of the car is illustrated by the second graph from the left in Fig. 8. Again, when the second pair of wheels of the car leave the retarder and pass out of the section D–E there is an interval during which the leading pair of wheels of the second truck of the car shunt the rails and cause a corresponding voltage to appear at the terminals 16 and 17 of the loop circuit. The third graph from the left of Fig. 8 illustrates the voltage caused to appear at the output of the loop circuit by the shunting of the rails by the No. 3 pair of wheels of the car. Finally, there will be an interval during which the rear pair of wheels of the car provide a shunt and cause a corresponding voltage to appear at the terminals 16 and 17 of the loop circuit, this voltage being illustrated by the right-hand graph of Fig. 8.

It follows from the foregoing analysis of the shunting action effected by the different pairs of wheels of the car as the car passes through the retarder that with the receiver 29 of Fig. 7 constructed in the manner of the receiving apparatus of Fig. 1, the speed of the car 30 of Fig. 7 will be determined and the braking force of the retarder controlled accordingly until the last pair of wheels of the car has left the retarder.

In Fig. 9 there is shown a form of apparatus embodying the invention wherewith a loop circuit LC1 is mounted for inductive relation with the rails of a track section in substantially the same manner as in Fig. 1. In Fig. 9 the loop circuit LC1 is connected to a source of alternating current through a resistor 31 adjusted to limit the current supplied to the loop circuit to a selected value. The track rails of the section D–E are connected to the input of a receiver 32 which includes a differentiator similar to the receiving apparatus of Fig. 1. The receiver 32 is shown connected across the rails by wires 33 and 34 at a point adjacent the end of the loop circuit at which the alternating current is supplied but the connection of the receiver can be at a point adjacent the other end of the loop circuit as will be pointed out shortly. With the car moving in the direction indicated by an arrow, the shunting of the track rails by the leading pair of car wheels completes the receiver input circuit and the voltage induced in the rails due to the alternating current flowing in the loop circuit is applied to the receiver. As the car advances toward the end D of the section the length of the rails in which voltage is effectively induced progressively decreases so that the voltage applied to the receiver decreases from a predetermined value to zero, the rate of decrease being determined by the speed of the car. Hence the speed of the car at all times is determined by the receiver 32 the same as in Fig. 1. Again, if the receiver 32 is connected across the rails adjacent the right-hand end of the loop circuit LC1 as viewed in Fig. 9, the induced voltage applied to the receiver 32 is approximately zero when the car shunts the rails adjacent this end of the loop circuit and increases to a predetermined value when the car shunts the rails adjacent the left-hand end of the loop circuit, the rate of increase of the induced voltage being determined by the speed of the car so that the car speed is again determined by the receiver 32.

It is to be understood that while the rails are shown formed into an insulated track section the rails need not be electrically insulated in this manner, the essential features being the point in the rails at which the current is supplied or the point at which the induced voltage is received from the rails, and the length of the loop circuit inductively associated with the rails.

Although I have herein shown and described certain forms of wayside vehicle speed determining means embodying my invention, it is understood that various changes and modifications may be made therein within the scope of the appended claims without departing from the spirit and scope of my invention.

Having thus described my invention, what I claim is:

1. The method of determining the speed of a railway vehicle as it progresses between two fixed points spaced along a railway track, comprising the steps of creating an alternating voltage which progressively varies from a first to a second value as the vehicle moves from a first one to the second one of the fixed points, said voltage being created due to the inductive relation between a track circuit including the track rails between the two fixed points and a loop circuit including a conductor mounted along at least one of the track rails of the track circuit, and detecting the slope of the envelope of the magnitude of the created voltage.

2. The method of determining the speed of a railway vehicle as it travels between two fixed points spaced along a railway track comprising, the steps of inductively producing an alternating voltage the magnitude of which is varied from a first to a second value at a rate corresponding to the instantaneous speed of the vehicle in traveling between said two fixed points, said voltage being produced due to an inductive relationship between a track circuit including the track rails between said fixed points and a loop circuit having a pair of conductors one mounted along each rail of the track circuit, rectifying said alternating voltage, and detecting the slope of the envelope of the magnitude of the rectified voltage.

3. Means for determining the speed of a railway vehicle comprising, a first and a second circuit extending between two fixed points along a stretch of railway track over which a railway vehicle moves, said first circuit including the track rails in series between said two fixed points, said second circuit including a pair of conductors in series between said fixed points, said conductors mounted one for inductive relation with one track rail and the other for inductive relation with the other track rail, means including a source of alternating current connected to a selected one of said circuits adjacent a selected one of said fixed points to induce an alternating voltage in the nonselected circuit due to said inductive relation between the rails and said conductors, said inducted voltage being varied in its magnitude when said vehicle moves between said fixed points due to the shunting of the rails by the vehicle varying the length of the rails having effective inductive relation to said conductors whereby the magnitude of the induced voltage is varied at a rate determined by the speed of the vehicle, and a receiver connected to said nonselected circuit to receive said induced voltage and including a differentiator responsive to the rate at which the magnitude of the induced voltage is varied and thereby determining the speed of the vehicle.

4. Means for determining the speed of a railway vehicle comprising, an insulated track section, a source of alternating current connected across the rails of a selected end of the section whereby alternating current flows in the section rails in series from said selected end up to the shunt of the leading pair of wheels of a vehicle moving through the section toward the selected end, a loop circuit having one side mounted along one section rail and its other side mounted along the other section rail whereby an alternating voltage is induced in the loop circuit due to the alternating current flowing in the section rails when the rails are shunted, said alternating voltage having a predetermined magnitude when the rails are shunted by the leading pair of wheels of said vehicle at the end of the section remote from said selected end and decreasing to substantially zero when the rails are shunted at said selected end, and a receiver including differentiating circuit means connected to said loop circuit to detect the decreasing envelope of the magnitude of said alternating voltage and thereby determining the speed of the vehicle.

5. Means for determining the speed of a railway vehicle comprising, an insulated track section, a source of periodic current connected across the rails adjacent a selected end of the section whereby current flows in the rails in series from said selected end up to the shunt formed by the leading pair of wheels of the vehicle moving through the section toward said selected end, a loop circuit having at least two conductors joined at one end and open at the other end, said conductors mounted one along one section rail and the other mounted along the other section rail for the full length of the section, each said conductor having inductive relation with the section rail along which it is mounted whereby a voltage is induced in said loop circuit in response to said periodic current caused to flow in the section rails due to said vehicle moving through the section, said induced voltage having a predetermined magnitude when the leading pair of wheels of the vehicle shunt the rails at the end of the section opposite said selected end and decreasing to substantially zero when the vehicle reaches said selected end, the magnitude of said voltage decreasing at the rate determined by the speed of the vehicle, and a receiver connected across said open end of the loop circuit and including means responsive to said periodic voltage and effectively influenced by the rate at which the magnitude of the induced voltage is made to decrease.

6. Means for determining the speed of a railway vehicle comprising, an insulated track section having an entrance end and an exit end with respect to a given direction of traffic, a source of periodic current connected across the rails adjacent the exit end of the section whereby the current flows in the section rails in series from said exit end up to the shunt formed by the leading pair of wheels of a vehicle moving through the section in said given direction, a loop circuit having one side mounted along one section rail for the full length of the section and its other side mounted along the other section rail for the full length of the section, said loop circuit having a pair of output terminals across which a periodic voltage is made to appear when said vehicle moves through the section due to the inductive relation of the loop circuit with the rails of the section, said voltage having an amplitude of a predetermined value when the leading pair of wheels of the vehicle shunt the rails at said entrance end and decreasing to substantially zero when the vehicle shunt is at said exit end due to progressively decreasing the length of the rails in which the periodic current flows, and a receiver connected across said loop circuit terminals to receive the induced voltage and including means effectively influenced according to the rate at which the amplitude of the voltage is made to decrease.

7. Means for determining the speed of a railway vehicle adapted to move over a given track, the combination comprising, an insulated track section formed in the track, a track circuit including the rails of said section and a source of alternating current connected across the rails adjacent a selected end of the section whereby the current flows in the rails in series from said selected end up to the shunt formed by the leading pair of wheels of a vehicle moving through the section toward said selected end, an impedance unit interposed in the connection of said source to said rails, said unit having a relatively large impedance as compared to the impedance of the section rails for said current whereby the amplitude of the current flowing in the rails is substantially constant irrespective of the point in the section the vehicle shunts the rails, a loop circuit including at least two conductors one mounted along one of the section rails and the other mounted along the other section rail for a selected portion of the section, said loop circuit conductors joined at one end and open at the other end, said conductors having distributed inductive relation with the section rails whereby a voltage is made to appear across the open ends of the conductors when said vehicle moves through the section toward said selected end, said voltage having a predetermined amplitude when the vehicle is at the end of said selected portion opposite the selected end of the section and decreasing to substantially zero when the vehicle is at the end of the selected portion nearer the selected end, the slope of the amplitude of the induced voltage being determined by the speed of the vehicle, and a receiver connected across said open end of the loop circuit conductors and including differentiating circuit means responsive to the slope of the amplitude of the induced voltage.

8. Means for determining the speed of a railway vehicle adapted to move over a given track, the combination comprising, a track section having a track circuit which includes the section rails, a loop circuit having a pair of conductors one mounted along one rail of the section and the other mounted along the other rail of the section, each said conductor having inductive relation with the rail along which it is mounted, means including a source of alternating current connected to said loop circuit to supply current which flows in said conductors in series, said loop circuit current inducing an alternating voltage in said track circuit due to said inductive relation of the conductors and section rails, said induced voltage having a predetermined value when the section rails are shunted by the vehicle adjacent one end of the section and being substantially zero when the vehicle shunts the rails adjacent the other end of the section, a receiver connected across the rails of said section to receive said induced voltage, and said receiver including a differentiating means responsive to the rate of change of the magnitude of the induced voltage caused by the vehicle moving through the section and thereby determining the speed of the vehicle.

9. In combination, a railway vehicle adapted to travel over a given stretch of railway track, said vehicle normally traveling in a given direction, an insulated track section formed in said track; a track circuit including the rails of said section, an impedance unit and a source of alternating current; said source and said impedance unit being connected in series across the rails adjacent the exit end of the section for said given direction, said unit being of a relatively large impedance as compared to the impedance of the rails of the section for said current whereby current of substantially constant amplitude flows in the rails as the vehicle traverses the section and its leading pair of wheels shunt the rails and the portion of the rails in which the current flows progressively decreases as the vehicle moves from the entrance end to the exit end of the section, a loop circuit including at least two conductors closed at one end and open at the other end, said conductors mounted one along one section rail and the other conductor mounted along the other section rail for the full length of the section, each said conductor having inductive relation with the rail along which it is mounted whereby a voltage is made to appear across said open ends of said conductors when the vehicle traverses the section, said induced voltage having a predetermined amplitude when the leading pair of wheels of the vehicle shunt the rails at the entrance end of the section and decreasing to substantially zero when the vehicle shunt is at the exit end of the section, the slope of the amplitude of the voltage being determined by the vehicle speed, and a receiver connected across said open ends of the loop circuit conductors and including circuit means responsive to said slope of the amplitude of said induced voltage.

10. In combination, an insulated section formed in a railway track over which traffic normally moves in a given direction; a track circuit for said section including the section rails, a source of periodic current and an impedance unit; said source and said impedance unit being connected in series across the section rails adjacent the exit end of the section for said given direction, said unit having a relatively large impedance as compared to the impedance of the section rails for said current whereby current of substantially constant amplitude flows in the rails as the rails are progressively shunted by the leading pair of wheels of a vehicle traversing the section, a loop circuit including at least two conductors closed at one end and open at the other end, said conductors being mounted one along one of the section rails for at least a selected portion of the section and the other conductor mounted along the other section rail for said selected portion of the section, each said conductor having inductive relation with the rail along which it is mounted whereby a periodic voltage is made to appear across the open ends of said loop circuit conductors due to the current caused to flow in the rails when the vehicle traverses the section, said voltage having a predetermined amplitude when the leading pair of wheels of the vehicle shunt the section rails adjacent the end of said selected portion remote from the exit end of the section and decreasing to substantially zero when the leading pair of wheels of the vehicle shunt the rail adjacent the end of the selected portion nearer to the exit end of the section, the slope of the amplitude of said voltage being determined by the speed at which the vehicle moves along said selected portion, and a receiver connected across said open end of the loop circuit conductors and including slope detecting means responsive to the slope of the amplitude of said voltage.

11. In combination, a first and a second electrical conductor spaced apart and extending parallel to each other for a given stretch, said conductors adaptable of being shunted; a control circuit including said conductors, a source of periodic current and an impedance unit; said source and said impedance unit being connected in series across said conductors adjacent a selected end of said stretch whereby the periodic current flows in the conductors in series when the conductors are shunted, said unit having an impedance relatively large as compared to the impedance of said conductors for the periodic current whereby the amplitude of the periodic current flowing in said control circuit is substantially constant irrespective of the point along said stretch said conductors are shunted, a loop circuit including at least two conductors joined at one end and open at the other end, said loop circuit conductors mounted one along said first conductor of the control circuit and the other mounted along said second conductor of the control circuit for the full length of said stretch, each said loop circuit conductor having inductive relation with the control circuit conductor along which it is mounted whereby an induced voltage is made to appear across the open ends of the loop circuit conductors in response to the periodic current made to flow in the control circuit conductors due to the shunting thereof, said induced voltage having a predetermined amplitude when the shunt of the control circuit conductors is at the end of the stretch remote from said selected end and decreasing to zero when the shunt is progressively moved along said first and second conductors to said selected end, and a receiver connected across said open ends of the loop circuit conductors and including slope detecting means responsive to the slope of the decrease in the amplitude of the induced voltage to determine the speed at which the shunt is made to progress along said first and second conductors.

12. In means for determining the speed of a railway vehicle moving along a given stretch of track in a given direction, the combination comprising, an insulated track section formed in the stretch, a track circuit for said section including a source of alternating current of a selected frequency and the rails of said section, said source being connected across the rails adjacent the exit end of the section for said given direction whereby the alternating current flows in the section rails in series when the rails are shunted, the current flowing in the rails from the exit end up to the point the rails are shunted, said source including means to supply current of substantially the same amplitude irrespective of the point in the section the rails are shunted, a loop circuit including at least two conductors which are joined at one end and open at the other end, said loop circuit conductors mounted one adjacent one section rail and the other adjacent the other section rail, each said conductor having distributed inductive relation with the section rail adjacent which it is mounted whereby an alternating voltage is created across the open end of the loop circuit when a vehicle moves through said section, said alternating voltage having a predetermined magnitude when the section rails are shunted by the leading pair of wheels of the vehicle at the entrance end of the section for said given direction and decreasing to substantially zero when the leading pair of wheels of the vehicle shunt the rails to the exit end of the section, a receiver connected across the open end of the loop circuit to receive said alternating voltage, said receiver including a rectifier and a differentiator, said rectifier having its input terminals connected to the loop circuit and its output terminals connected to said differentiator whereby there is applied to the differentiator a direct voltage having a slope corresponding to the rate the magnitude of the alternating voltage is made to decrease as the vehicle moves through the section, and said differentiator including circuit means responsive to the slope of said direct voltage and thereby determining the speed at which the vehicle moves through the section.

13. In combination, a stretch of railway track, a track circuit including the track rails for a selected portion of said stretch, a loop circuit including a pair of conductors in series, said conductors being mounted one along one rail of said selected portion of the stretch and the other along the other rail of the selected portion of the stretch, each said conductor having inductive relation with the rail along which it is mounted, means including a source of alternating current connected to said loop circuit to supply current which flows in said conductors in series to induce an alternating voltage in said track circuit, a receiver connected across the rails to receive said induced voltage when the rails are shunted, said induced voltage having a predetermined magnitude when the rails are shunted adjacent a selected end of said portion of the stretch and substantially zero when the rails are shunted adjacent the other end of said portion of the stretch, the magnitude of said induced voltage being varied at a rate determined by the speed the shunt of the rails is moved along said portion of the stretch, and said receiver including means responsive to the rate of variation of the magnitude of said induced voltage.

14. Means for determining the speed of a railway vehicle comprising, an insulated track section, a source of alternating current connected across the rails adjacent a selected end of the section whereby the alternating current flows in the section rails in series from said selected end up to the shunt of the leading pair of wheels of a vehicle moving through the section toward said selected end, a loop circuit having at least one side mounted along one section rail for the full length of the section for inductive relation with said one rail, whereby an alternating voltage having a predetermined magnitude is induced in the loop circuit when the section rails are shunted by said leading pair of vehicle wheels at the end of the section remote from said selected end and decreasing to substantially zero when said leading pair of vehicle wheels shunt the rails at said selected end, and a receiver connected to said loop circuit and including differentiating circuit means variably influenced by the slope of said decreasing magnitude of said induced voltage.

15. Means for determining the speed of a railway vehicle comprising, an insulated track section, supply means including a source of alternating current and an impedance unit, said source and said impedance unit being connected in series across the rails of the section adjacent a selected end of the section whereby alternating current flows in the section rails in series from said selected end up to a shunt formed across the rails by the leading pair of wheels of a vehicle moving through the section toward said selected end, said impedance unit having a relatively large impedance as compared to the impedance of the rails of the section for said alternating current whereby the alternating current flowing in the section rails has a substantially constant magnitude irrespective of the point at which the rails are shunted, a loop circuit including a pair of conductors closed at one end and open at the other end, at least one conductor of said loop circuit mounted along one of the section rails for the full length of the section for inductive relation thereto whereby an alternating voltage is induced in the loop circuit while the vehicle is traversing the section, said induced voltage having a predetermined magnitude when the leading pair of wheels of the vehicle shunt the rails at the end of the section remote from said selected end and decreasing to substantially zero when the leading pair of vehicle wheels shunt the rails at said selected end, the rate of said decrease of the magnitude of the induced voltage being determined by the speed at which the vehicle advances to decrease the length of said one rail in which the alternating current flows, a receiver including a differentiator connected to said loop circuit to receive said induced voltage, and said differentiator including means responsive to the rate of decrease of the magnitude of the induced voltage and thereby determine the speed of the vehicle.

References Cited in the file of this patent

UNITED STATES PATENTS

| | | |
|---|---|---|
| 1,328,865 | Woodward | Jan. 27, 1920 |
| 1,492,301 | McLeer | Apr. 29, 1924 |
| 2,105,930 | Reichard | Jan. 18, 1938 |
| 2,251,973 | Beale et al. | Aug. 12, 1941 |
| 2,361,466 | Fitzsimmons | Oct. 31, 1944 |
| 2,408,711 | Volz | Oct. 1, 1946 |
| 2,442,765 | Franklin | June 8, 1948 |
| 2,488,815 | Hailes | Nov. 22, 1949 |
| 2,513,340 | Lyman | July 4, 1950 |